United States Patent [19]

Ohnishi et al.

[11] Patent Number: 5,039,208

[45] Date of Patent: Aug. 13, 1991

[54] POLYMER LIQUID CRYSTAL DEVICE

[75] Inventors: Toshikazu Ohnishi, Atsugi; Kazuo Yoshinaga, Machida; Takeshi Miyazaki, Ebina; Yutaka Kurabayashi, Yokohama, all of Japan

[73] Assignee: Canon Kabushiki Kaisha, Tokyo, Japan

[21] Appl. No.: 609,067

[22] Filed: Nov. 1, 1990

Related U.S. Application Data

[63] Continuation of Ser. No. 202,013, Jun. 3, 1988, abandoned.

[30] Foreign Application Priority Data

Jun. 4, 1987 [JP] Japan .............................. 62-140646
May 16, 1988 [JP] Japan .............................. 63-118802

[51] Int. Cl.$^5$ .............................................. G02F 1/13
[52] U.S. Cl. .............................. 359/100; 252/299.01; 428/1; 359/75
[58] Field of Search .............................. 428/1, 411.1; 252/299.01, 582, 589; 350/330, 331 R, 346, 350 S, 340

[56] References Cited

U.S. PATENT DOCUMENTS

| | | | |
|---|---|---|---|
| 4,388,453 | 6/1983 | Finkelmann et al. | 528/15 |
| 4,624,872 | 11/1986 | Stuetz | 428/1 |
| 4,702,558 | 8/1987 | Coles et al. | 350/330 |
| 4,844,835 | 7/1989 | Uchida et al. | 252/299.01 |
| 4,946,261 | 8/1990 | Yaegashi et al. | 350/353 |
| 4,963,402 | 10/1990 | Wong | 428/1 |
| 4,981,614 | 1/1991 | Miyazaki et al. | 252/587 |

FOREIGN PATENT DOCUMENTS

| | | | |
|---|---|---|---|
| 293911 | 12/1988 | European Pat. Off. | 252/299.01 |
| 2166685 | 5/1986 | United Kingdom . | |

OTHER PUBLICATIONS

Bualek, S. et al., Mol. Cryst. Liq. Cryst. 155, 47, 1988.
Shibaev, V. P. and Platé, N. A., in Advances in Polymer Science 60/61, Springer-Verlag, Berlin, 1984, pp. 232–236.
Hawley's Condensed Chemical Dictionary, Van Nostrand Reinhold Co., New York, 1987.
Makromol. Chem., vol. 188 (1987) 665:74.
Fettes, Chemical Reaction of Polymers, Interscience, New York, 785:6; 775, 1964.
Westlinning, Rubber, Chemical Technology, vol. 35 (1962) 274.
Brown, Rubber, Chemical Technology, vol. 36 (1963) 931.
Matsuo, Polymer J., vol. 17 (1985) 1197.
Zentel, Macromolecular Chemistry, vol. 187 (1988) 1915.
Zentel, Liquid Crystals, vol. 2, No. 1 (1987) 83.
Uchida, J. Polymerization Science, vol. A-2, No. 10 (1972) 101.
Brown, Rubber Industry (1975) 102.
Zentel, Macromolecular Chemistry, vol. 188 (1987) 665.

Primary Examiner—John S. Maples
Assistant Examiner—Richard Treanor
Attorney, Agent, or Firm—Fitzpatrick, Cella, Harper & Scinto

[57] ABSTRACT

A crosslinked polymer liquid crystal is stretched to provide a polymer liquid crystal layer with a higher degree of uniform alignment than a non-crosslinked polymer liquid crystal. Such a stretched layer of crosslinked polymer liquid crystal is disposed between a pair of substrates to form a liquid crystal device showing a better contrast as a recording medium or display device. The improvement in alignment obtained by stretching of a crosslinked polymer liquid crystal is also effective in increasing the responsive characteristics in response to an electric field or magnetic field and also the pyroelectric effect of the resultant polymer liquid crystal layer where the polymer liquid crystal is a ferro-electric one.

26 Claims, 4 Drawing Sheets

POLYMER LIQUID CRYSTAL DEVICE

This application is a continuation of application Ser. No. 202,013, filed June 3, 1988, now abandoned.

FIELD OF THE INVENTION AND RELATED ART

The present invention relates to a liquid crystal device having a polymer liquid crystal layer formed through alignment or orientation by stretching a crosslinked polymer liquid crystal.

It has been recently considered to apply a polymer liquid crystal which has been hitherto used for producing high-strength and high-modulus fiber, etc., to a display device or memory device similarly as a low-molecular weight liquid crystal. A problem encountered in use of a polymer liquid crystal in a liquid crystal device is alignment or orientation of the polymer liquid crystal. A characteristic method for alignment of a polymer liquid crystal is stretching alignment thereof utilizing the stretching alignment or orientation characteristic of a polymer. According to this method, a polymer liquid crystal per se is supplied with a force so that a higher alignment characteristic can be expected than conventional methods applied to low-molecular weight liquid crystals, such as one using an alignment film. Such an alignment method for a polymer liquid crystal by stretching has been disclosed by Japanese Laid-Open Patent Application (Kokai) Sho61-137133, etc.

In a polymer liquid crystal simply subjected, to spinning or film-formation, minute structural units, such as different sizes of spherulite and lamellas are aligned at random and amorphous chain portions are entangled in a complex manner. When such a polymer liquid crystal sample is stretched, ununiform tension is exerted to result in amorphous chain portions under excessive tension and amorphous portions remaining totally relaxed, so that the degree of alignment of the sample is limited after the stretching.

SUMMARY OF THE INVENTION

It is therefore an object of the present invention is to provide a polymer liquid crystal device having a polymer liquid crystal layer satisfying a higher degree of alignment than that realized before by stretching a crosslinked polymer liquid crystal to effect the alignment.

Another object of the present invention is to provide a liquid crystal device of a high contrast.

Thus, according to the present invention, there is provided a polymer liquid crystal device comprising an aligned polymer liquid crystal layer obtained by stretching a crosslinked polymer liquid crystal which comprises polymer main chains crosslinked with each other.

These and other objects, features and advantages of the present invention will become more apparent upon a consideration of the following description of the preferred embodiments of the present invention taken in conjunction with the accompanying drawings, wherein like parts are denoted by like reference numerals.

DETAILED DESCRIPTION OF THE PREFERRED EMBODIMENTS

Figure 1:
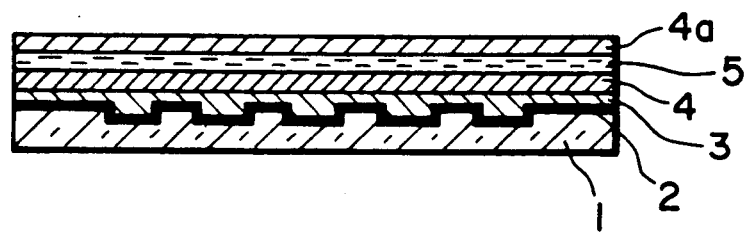
FIG. 1 is a sectional view of an optical card as produced in Examples 1, 2, 4 and 7 of the present invention and. Comparative Examples 1, 2 and 3.

In the present invention, a crosslinked polymer liquid crystal is stretched for alignment. The crosslinking of a polymer liquid crystal may be effected in the same manner as in conventional polymer crosslinking. Herein, the term "crosslinking" inclusively refers to the following modes or methods of crosslinking.

① Crosslinking obtained by forming covalent bonds between polymer (main) chains through a reaction.

② Crosslinking obtained by forming ionic bonds or hydrogen bonds.

③ Crosslinking formed by a block polymer which comprises a chain segment of relatively easy thermal movement (soft segment) and a segment with a very strong molecular force (hard segment) in mixture.

④ Crosslinking formed by interaction between a polymer and a filler, such as carbon black and silica.

⑤ Crosslinking formed by entanglement of polymer chains.

In the field of polymers, the above-mentioned crosslinking through covalent bonds ① may generally be referred to as "crosslinking" in a narrow sense. In view of the solubility in or affinity with a solvent of a polymer liquid crystal, dynamic characteristics of a polymer liquid crystal and physical properties including electro-optical characteristics of the device obtained after stretching alignment, the crosslinking of a polymer liquid crystal need not necessarily be one with covalent bonds but can be "crosslinking" in a broader sense inclusive of those with relatively weak chemical bonds and physical polymer chain entanglement as described in ②-⑤ above.

The crosslinking structure in a polymer liquid crystal may be confirmed by 1) detection of a change in relaxation time or NMR spectrum due to branch structure, hydrogen bond and mutual interaction by nuclear magnetic resonance, such as $^1$H-NMR, $^{13}$C-NMR, or CP/MAS; 2) analysis of characteristic in rubber region through maasurement of temperature dispersion, frequency dispersion of elasticity constant; or 3) measurement of degree of swelling and stress-elongation relationship in a swollen state. (More details may be obtained from "Nyuhmon Kobunshi Tokusei Kaiseki-Bunshi, Zairyoh" no Characterization (Guide to Polymer Characteristic Analysis-Characterization of Molecule and Material) Edited by Polymer Society of Japan, published from Kyohritsu Shuppan K.K.). The above methods can be combined as desired.

In the present invention, crosslinking of a polymer liquid crystal may be effected in the following manner while it depends on the type of the polymer liquid crystal (whether it is of a main chain-type or of a side chain-type).

Generally, crosslinking may be effected by reacting a crosslinking agent having two or more functional groups and a reactive group present in the main chain of a polymer liquid crystal. Specific examples the reactive group used for crosslinking may include the following.

(1) Hydrogen-accepting group:

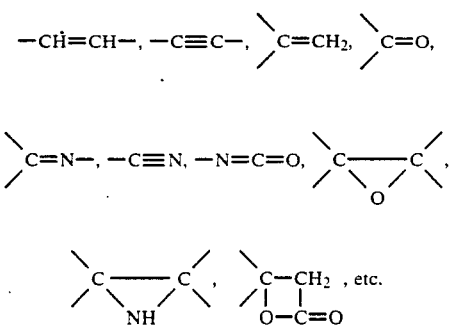

(2) Hydrogen-donating group:
—OH, —SH, —COOH, —COSH, —NH$_2$, —CH$_3$, =N—OH, etc.

(3) Others:
—F, —Cl, —COCl, —N$_2$Cl, —CON$_3$, —SO$_2$N$_3$, salt- or chelate forming groups, etc. Crosslinking may be effected through crosslinking reactions inclusive of condensation and addition reactions, such as esterification, urethane formation, amide formation, and imide formation, and formation of ion linkages with metal ions.

The reactive groups may be introduced into polymer liquid crystals through copolymerization or polymer reactions. Further, in case where a polymer liquid crystal is obtained through addition polymerization of a vinyl monomer, a crosslinking agent such as divinylbenzene may be added to a monomer for a polymer liquid crystal to form a crosslinked polymer liquid crystal through copolymerization. It is also possible to cause a crosslinking reaction by irradiating a polymer liquid crystal with radiation or actinic light or by reaction with organic peroxides, such as benzoyl peroxide and dicumyl peroxide, azo compounds, thiurams, pinacols, etc., to generate radicals in the polymer liquid crystals.

Further, crosslinking by entanglement of polymer chains as described in ⑤ may be formed by dissolving a polymer liquid crystal in an appropriate solvent such as a mixture of decalin and toluene under heating, and cooling and drying the resultant solution to form a polymer liquid crystal gel wherein entanglement of polymer chains in the solution is retained. More specifically, the solvent suitably used for this purpose is one which dissolves the polymer liquid crystal on heating but does not readily dissolve the polymer liquid crystal at room temperature. The crosslinking structure of the polymer liquid crystal treated with such a relatively poor solvent can be confirmed by the presence of a rubbery region above the liquid crystal isotropic phase transition temperature. In the rubbery region, the crosslinked polymer liquid crystal thus obtained shows a substantially constant elasticity modulus on a log E (elasticity modulus)-temperature curve as obtained through measurement by an automatic dynamic viscoelasticity meter with a sample of 3 cm long, 1 cm wide and 0.2 cm thick. On the other hand, a non-crosslinked polymer liquid crystal as obtained through a similar treatment with a good solvent such as dichloroethane fails to show a rubbery region but merely shows a continuous decrease in elasticity above the liquid crystal-isotropic transition point on a log E-temperature curve obtained in a similar measurement.

The polymer liquid crystal concentration in a solution for crosslinking by entanglement of polymer chains described above may suitably be in the range of about 0.5 to 70 vol. %. Too low a concentration fails to provide a sufficient degree of entanglement. Too high a concentration is not suitable for providing a sufficient degree of stretching of the resultant crosslinked polymer liquid crystal.

Among the above methods of crosslinking a polymer liquid crystal, the method or crosslinking mode of ⑤ is particularly advantageous because a crosslinked polymer liquid crystal can show the same liquid crystal phase change as in its non-crosslinked state and the method in applicable to most of the known polymer liquid crystals through appropriate selection of the solvent.

Further, according to the methods of ① or ② above, a desired effect is obtained by controlling the chemical structure of a crosslinking agent and/or the number of crosslinkages, i.e., a crosslinking degree. The crosslinking degree may be determined by the proportion of crosslinking reactive group, the amount of the crosslinking agent added for reaction. Further, in the case of crosslinking mode, ③, the degree of crosslinking is determined by the proportion of the hard segment in the polymer liquid crystal.

With respect to the crosslinking modes ①-②, the degree of crosslinking may be defined by the molar percentage of the crosslinking agent used for crosslinking per mol of the non-crosslinked polymer liquid crystal. In the present invention, the degree of crosslinking of a polymer liquid crystal may suitably be in the range of 0.001–75 mol %, preferably 0.01–50 mol %, further preferably 0.05–30 mol %.

In the case of crosslinking modes ④ and ⑤, a degree of crosslinking equivalent to that obtained in the case of 1–3 may also be selected by adjusting the amount of addition of the filler or the kind and concentration of the solvent for gel formation.

Generally, too low a crosslinking degree fails to provide a sufficient alignment effect even after the stretching. On the other hand, too large a crosslinking degree provides a difficulty in device formation because of a lowering in solubility in a solvent. Further, too large a crosslinking degree can result in a remarkable change in liquid crystal phase transition temperature, thus failing to show a device function.

By stretching a crosslinked polymer liquid crystal according to the present invention, it is possible to obtain a higher degree of alignment than obtained by stretching a non-crosslinked polymer liquid crystal. This is presumably because, when a polymer liquid crystal having a crosslinked main chain is stretched, the main chain is supplied with a uniform force through a crosslinked point to be elongated. When a polymer liquid crystal free of a crosslinked point is stretched, it is possible that some polymer chains do not receive a dynamic function so that nonstretched three dimention structures remain as they are in the sample after the stretching.

The polymer liquid crystal used in the present invention may be a known material showing a thermotropic mesomorphism. More specifically, the polymer liquid crystal may be a side chain or branch type polymer liquid crystal comprising a main chain polymer of acrylic acid, methacrylic acid, 2-chloroacrylic acid, siloxane, etc. and side chains like pentands of a low-molecular weight liquid crystal, or a main-chain type polymer liquid crystal of polyester or polyamide type which has been commercially used in the field of high-strength, high-modulus, heat-resistant fiber or resin.

Specific examples of the side chain type polymer liquid crystal may include the following:

Methacrylate polymer $$+CH_2-C+_n$$
$$\quad\quad |$$
$$\quad\quad CH_3$$
$$\quad\quad C=O$$
$$\quad\quad |$$
$$\quad\quad OR_1$$

$R_1 = (CH_2)_6-O-\text{⌬}-\text{⌬}-CN$

Glass $\xrightarrow{55° C.}$ S $\xrightarrow{100° C.}$ Iso.

S: smectic phase, Iso.: isotropic phase.

Acrylate polymer $$+CH_2-CH+$$
$$\quad\quad |$$
$$\quad\quad C=O$$
$$\quad\quad |$$
$$\quad\quad OR_2$$

$R_2 = (CH_2)_2O-\text{⌬}-COO-\text{⌬}-OCH_2\overset{*}{C}H-CH_2CH_3$
$\hspace{9cm}|$
$\hspace{9cm}CH_3$ Glass $\xrightarrow{65° C.}$ Sm*C $\xrightarrow{110° C.}$ S$_A$ $\xrightarrow{146° C.}$ Iso Sm*C: chiral smectic C phase, S$_A$: smectic A phase Siloxane polymer $$+Si-O+_n$$
$$\quad\quad |$$
$$\quad\quad CH_3$$
$$\quad\quad |$$
$$\quad\quad R_3$$

-continued $R_3 = (CH_2)_3-O-\text{⌬}-O-\overset{O}{\underset{\|}{C}}-\text{⌬}-OC_5H_{11}$ Glass $\xrightarrow{43° C.}$ S$_B$ $\xrightarrow{52° C.}$ S$_A$ $\xrightarrow{177° C.}$ Iso S$_B$: smectic B phase On the other hand, specific example of the main chain-type polymer liquid crystal may include the following:

Polyester-type $+O-\overset{O}{\underset{\|}{C}}-\text{⌬}-O-\overset{O}{\underset{\|}{C}}-\text{⌬}(Br)-\overset{O}{\underset{\|}{C}}-O-\text{⌬}-\overset{O}{\underset{\|}{C}}-O-(CH_2)\overline{_{10}}+_n$ Solid $\xrightarrow{140° C.}$ N $\xrightarrow{196° C.}$ Iso N: nematic phase.

Other polymer liquid crystals may also be used.

The polymer liquid crystal used in the present invention can be mixed with another polymer or non-cross-linked polymer liquid crystal in order to modify glass transition temperature, dynamic properties for device formation and filming property.

Further, it is also possible to add a colorant as shown below in order to improve the contrast of the device.

(A) anthraquinone dye with NH-phenyl-N(CH$_3$)$_2$ and OH substituents (B) benzothiazole-indandione dye with C$_2$H$_5$ group (C) CH$_3$O-⌬-N=N-⌬-NO$_2$ (D) azulene-based structure with multiple CH$_3$ groups

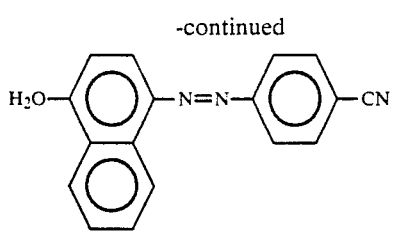
(E)

In the present invention, the thus-obtained crosslinked polymer liquid crystal is stretched to align the polymer liquid crystal.

It is possible to effect the stretching a polymer liquid crystal shaped in the form of film alone. In case where a polymer liquid crystal alone is stretched, not only the alignment of the liquid crystal is enhanced, but also the polymer liquid crystal per se is liable to have a strong anisotropy in mechanical strength and to cause a lowering in adhesiveness to the substrate. It is therefore desirable to laminate a polymer liquid crystal and a substrate and then stretch them simultaneously. As a result of such simultaneous stretching or co-stretching, the substrate and the polymer liquid crystal are oriented in the same direction, so that the substrate can function as a kind of orientation or alignment control layer. Further, the intimate contact between the substrate and the liquid crystal layer is ensured, and even if the liquid crystal is provided with a dynamic anisotropy through stretching, the liquid crystal layer is stably retained in the form of a film as it is held on the substrate.

In the present invention, it is possible to stretch a laminate of one substrate and a polymer liquid crystal layer and then apply a second substrate under pressure to form a liquid crystal device, or to first provide a laminate with a polymer liquid crystal layer sandwiched between two substrates and stretch the laminate in order to provide a further dynamic stability of the liquid crystal layer during the stretching.

The substrate used in the liquid crystal device of the present invention is required to be a stretchable one, such as a plastic plate in case where it is subjected to stretching but can be any type of known substrates if it is not stretched.

In the present invention, the lamination of the polymer liquid crystal on a substrate as a support may be effected in any known manner.

For example, a polymer liquid crystal may be heat-melted into a relatively fluid state as in nematic phase or isotropic liquid and then applied on a substrate. The application at this time may advantageously be effected, e.g., by blade coating, knife coating and extrusion coating in view of the viscosity of the polymer liquid crystal melted under heating and so as to exert a strong shear during coating, thus more effectively providing an alignment effect due to stretching thereafter.

On the other hand, it is also possible to first from a solution or dispersion of a polymer liquid crystal in an appropriate solvent and apply the solution or dispersion onto a substrate, followed by removal of the solvent, to form a laminate of the polymer liquid crystal on the substrate. In this case, the viscosity of the polymer liquid crystal solution or dispersion can be controlled by changing the concentration of the polymer liquid crystal in the solution, so that more application methods can be used than the above-mentioned case of applying a heated polymer liquid crystal. In this case, however, no alignment of the polymer liquid crystal is attained after the solvent removal, so that alignment should be effected solely by the stretching thereafter.

The application method may be selected in respective cases. In addition to the methods of application onto a substrate described above, there may be used various methods, such as compression molding of a polymer liquid crystal under heat and pressure onto a substrate to form a laminate, or lamination of a sheet or film of a polymer liquid crystal formed by T-die extrusion or co-extrusion onto a substrate.

The stretching of a polymer liquid crystal or a laminate of a substrate and a polymer liquid crystal may be effected in known manners for polymer stretching, inclusive of uniaxial stretching (free width or constant width), successive biaxial stretching and simultaneous stretching. Among these methods, the uniaxial stretching provides the most effective alignment of the polymer liquid crystal and is preferred. It is however possible to effect, e.g., successive biaxial stretching with extremely different two axial stretching ratios, thus effecting successive biaxial stretching approximate to uniaxial stretching.

A stretching ratio may be defined as follows.

Stretching ratio $(\%) = (\Delta L/L) \times 100$, wherein

L: length of a sample before stretching, $\Delta L$: difference in length of the sample after and before the stretching.

Based on the above definition, the stretching ratio in the present invention may be in the range of 5-150,000%, preferably 10-15000%, further preferably 20-5000%, most preferably 50-1000%.

Generally, a polymer not subjected to alignment or orientation, comprises in mixture local crystalline portions of spherulite or so-called "lamella" wherein polymer chains are regularly folded, and amorphous portions. A polymer liquid crystal assumes a similar mixture state wherein alignment of liquid crystal skeletons is locally different and is not uniform. When such a polymer liquid crystal sample in a non-uniform state is stretched, the lamella structure is aligned to some extent, and in the liquid crystal state, the liquid crystal skeletons are oriented in or perpendicular to the stretching direction. On further stretching from this state, the polymer main chains are completely elongated to realize a very high degree of alignment. In the liquid crystal state, a uniform alignment is realized. Such a high ratio of stretching is referred to as "super stretching". In this invention, when the polymer liquid crystal layer is aligned by such super stretching, a particularly advantageous effect is attained. In other words, crosslinking of a polymer liquid crystal allows such super stretching.

In the present invention, effective alignment may be realized by appropriate selection of crosslinking degree, kind of crosslinking and stretching ratio. For example, in order to carry out a high ratio of stretching such as super stretching as mentioned above, it is necessary to suppress the degree of crosslinking to 5 mol % or below. Too high a crosslinking degree leads to a problem such as stretching failure, severance of polymer main chains or breakage of the sample. On the other hand, if the crosslinking degree is below 0.001 mol %, substantially no crosslinking effect is attained to leave lamella structure and spherulite after the stretching and result in insufficient stretching of polymer main chains, thus failing to realize a high degree of uniform alignment.

In order to effect a high ratio of stretching such as super stretching in the present invention, the crosslinking mode of ② hydrogen bond or ionic bond or ⑤ physical entanglement is preferred than ① covalent mode. This is presumably because crosslinking of non-covalent bond allows movement of crosslinking points and reduction of crosslinking points.

When a polymer liquid crystal is stretched at a high stretching ratio, a strong dynamic anisotropy results. For this reason, the co-stretching with the substrate is effective as described hereinbefore. In addition to or in place thereof, it is possible to effect biaxial stretching jointly. In the biaxial stretching effected for this purpose, the ratio of stretching along two axes may preferably be in the range of 1:1 to 1:50.

The stretching in the present invention may be effected in known manners. For example, uniaxial stretching may be effected by passing a sample between two pairs of rotating rollers having different superficial speeds. Further, zone stretching or stretching with microwave heating can be applied.

The crosslinking degree in the present invention may be defined as the amount of crosslinking structure before stretching. Whether or not the crosslinking structure is present after the stretching will effect the performance of the polymer liquid crystal layer in a device. Among various modes of crosslinking applicable in the present invention, relatively weak crosslinking as by hydrogen bond can be destroyed to some extent after the stretching. Further, the crosslinking mode ⑤ of physical entanglement is considered to be advantageous because no crosslinking structure remains after the stretching.

The stretching of a polymer liquid crystal layer may be effected generally at a temperature of the glass transition temperature or above. If the stretching is effected at a temperature above the liquid crystal phase-isotropic phase transition temperature, the polymer main chains are elongated, and then gradually cooled to a temperature region of liquid crystal phase where liquid crystal skeletons are oriented. If the stretching is effected in a temperature region providing a liquid crystal phase, a uniform alignment is realized to provide better results. The alignment state of the thus-aligned polymer liquid crystal may be fixed by cooling to below the glass transition temperature.

In the present invention, it is preferred that the alignment of the polymer main chain and the alignment of the liquid crystal skeleton are on the same degree. For this reason, a main chain-type polymer liquid crystal is more advantageous than a side chain-type polymer liquid crystal.

In the present invention, it is also possible to apply an electric field or magnetic field at the time of stretching in order to supplement the alignment by the stretching.

On the other hand, depending on the polymer liquid crystal used, it is possible that so-called "cold stretching", i.e., stretching below the glass transition temperature is preferred in order to provide a high degree of alignment.

In the present invention, it is possible to form a crosslinked polymer liquid crystal by crosslinking a non-crosslinked polymer liquid crystal in the liquid crystal state (under the application of an electric field or magnetic field, as desired) and then stretching the crosslinked polymer liquid crystal. Further, it is also possible to apply a process wherein a non-crosslinked polymer liquid crystal is stretched to align the polymer main chains and liquid crystal skeletons to some extent, crosslinked in the thus somewhat aligned state and then further subjected to stretching. In this case, it is advantageous to apply different stretching methods before and after the crosslinking of the polymer liquid crystal. For example, the stretching before the crosslinking may be effected while maintaining the whole polymer liquid crystal at a certain temperature, and the stretching after the crosslinking may be effected while locally heating the crosslinked polymer liquid crystal by microwave heating-stretching or zone stretching.

The polymer liquid crystal device according to the present invention can be used as a memory or display device by combining it with electrode means, such as transparent electrodes or matrix electrodes similarly as a conventional liquid crystal device. In the polymer liquid crystal device, the thickness of the polymer liquid crystal layer after stretching may suitably be set in the range of $0.1 \mu m$–$100 \mu m$ in view of the sensitivity to light, heat or electric field applied to the device, the readout of memory and the necessity of contrast for display.

When the liquid crystal device of the present invention is used as a data recording medium such as an optical card or a display device, the polymer liquid crystal layer aligned in a certain direction through stretching alignment is subjected to a change in alignment state for recording by heating the liquid crystal layer by laser beam irradiation or a thermal head or by application of an electric field or magnetic field, and the difference in alignment state of the liquid crystal layer is detected as a difference in optical characteristic (such as light transmittance or birefringence) to effect readout of data or display.

Further, in case where the polymer liquid crystal has ferroelectricity, data recording or display may be effected through inversion of the spontaneous polarization by an electric field or disappearance of the spontaneous polarization by heating.

In case where the thickness of a ferroelectric polymer liquid crystal is decreased to release its helical structure, the inversion of the spontaneous polarization is mainly caused by direct interaction of the applied electric field and the spontaneous polarization. The improved alignment of the liquid crystal skeleton after the stretching given by the present invention functions to uniformize the direction of the spontaneous polarization to increase the interaction with the applied electric field and the dipole-dipole interaction in the Sm*C phase having spontaneous polarization, it is effective not only for an increased contrast ratio but also for improvement in response speed by inversion of the spontaneous polarization and threshold characteristic in response to the applied electric field.

Further, a ferroelectric compound generally shows pyroelectricity and piezoelectricity. Accordingly, in a device using a ferroelectric polymer liquid crystal, the magnitude or presence of the spontaneous polarization can be detected by utilizing the pyroelectricity or piezoelectricity. The piezoelectricity and pyroelectricity are generally affected by high order structural factors such as the branching, molecular weight, alignment and crystallinity in addition to the magnitude of the dipole moment determined by the molecular structure.

It has been found that the pyroelectricity of a crosslinked ferroelectric polymer liquid crystal after stretching is larger than the value obtained heretofore. More specifically, a ferroelectric polymer liquid crystal layer showing a maximum pyroelectric constant of 1 $\mu C/m^2 K$ or larger can be obtained while the magnitude of the pyroelectric constant varies depending on the temperature. If a polymer liquid crystal layer showing such a high pyroelectric constant is used in a device utilizing pyroelectricity, a polymer liquid crystal device showing a remarkably increased S/N ratio is obtained. The reason why an increased pyroelectric constant is attained through stretching of a crosslinked polymer liquid crystal may be attributable to harmonious thermal relaxation of dipole moments after stretching.

As described above, the polymer liquid crystal device of the present invention is a liquid crystal device comprising between substrates a highly aligned polymer liquid crystal layer obtained by stretching a crosslinked polymer liquid crystal. Because of a high degree of alignment of the polymer liquid crystal, the liquid crystal device provides a higher contrast than before when used as a memory or display device.

When the present invention is particularly applied to a ferroelectric polymer liquid crystal, not only the contrast ratio is improved through an improvement in alignment, but also an increased pyroelectric constant is obtained to provide an increased S/N ratio in a device utilizing pyroelectricity.

Hereinbelow, the present invention is explained more specifically based on Examples.

EXAMPLE 1

2 g of a polymer liquid crystal represented by the following structural formula and showing the following phase transition series:

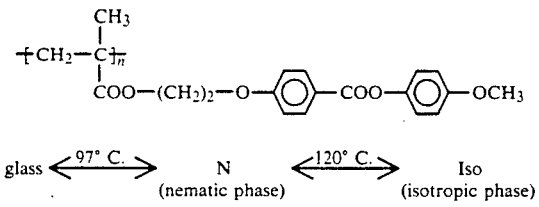

and 0.01 g of a light-absorbing colorant of the following structural formula:

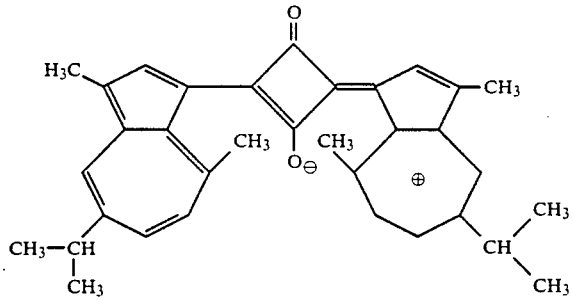

were added in a solvent mixture of decalin/toluene (1/1) and dissolved by heating at 150° C. The heated solution was cooled by pouring it into ethanol, followed by removal of the solvents by filtration and drying under vacuum to form a polymer liquid crystal gel containing the colorant.

The thus-obtained gel was rolled into a sheet by passing between a pair of opposed rollers. The sheet was dried under vacuum at room temperature and sandwiched between two 100 $\mu$m-thick polyester sheets. The resultant laminate was further passed through pressing rollers to effect bonding and rolling under pressure, thereby providing an about 50 $\mu$m-thick polymer liquid crystal layer.

The laminate was passed through two pairs of rollers rotating at different superficial speeds at a temperature where the polymer liquid crystal showed N phase, thereby to effect free-width uniaxial stretching at a stretching ratio of 60000%, followed by cooling to below the glass transition temperature.

The alignment of the polymer liquid crystal layer in the laminate was fixed in the aligned N phase state and the thickness of the polymer liquid crystal layer was about 3 $\mu$m.

Separately, a 1.5 mm-thick polycarbonate substrate of a wallet size provided with pre-grooves by a stamper was coated with a vapor-deposited Al layer as a light-reflecting layer, and further thereon, the above-obtained laminate cut into the wallet size was bonded to prepare an optical card as shown in FIG. 1 with its sectional view.

Referring to FIG. 1, the optical card comprised the polycarbonate substrate 1, the Al layer 2, an adhesive layer 3, the polyester layers 4 and 4a, and the polymer liquid crystal layer 5.

Figure 2:
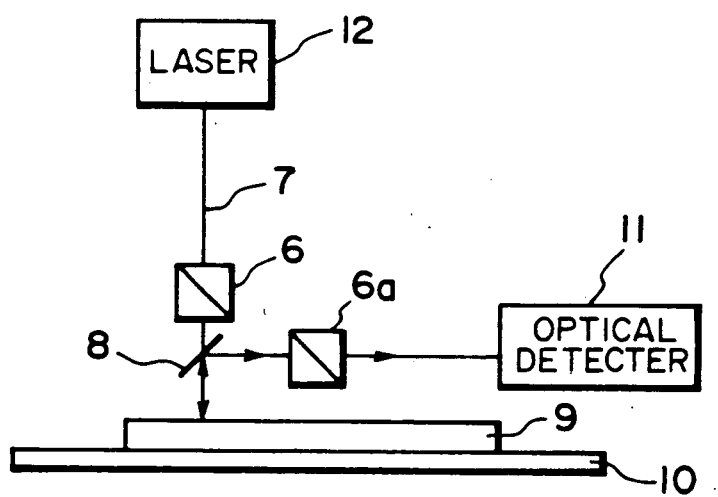
FIG. 2 is a schematic view of a recording and reproduction system for an optical card as used in Examples 1, 2, 4 and 7 and Comparative Examples 1, 2 and 3.

The thus prepared optical card was subjected to data recording and reproduction by means of an apparatus system shown in FIG. 2 which comprised a polarizer 6, an analyzer 6a, a half mirror 8, an optical card 9 as described above, a moving stage, an optical detector 11 and a semiconductor laser beam 12 emitting laser light 7.

More specifically, the optical card 9 was irradiated with semiconductor laser light ($\lambda = 830$ nm) at a power of 5 mW to locally heat the polymer liquid crystal layer 4 into isotropic phase, followed by rapid cooling to a temperature below the glass transition temperature to fix the isotropic phase state, whereby data writing was effected.

Then, the power of the semiconductor layer was lowered to 0.1 mW, and the optical card was illuminated with the laser light, whereby data reproduction was effected by detecting a difference in reflected light intensities from the recorded portion and the non-recorded portion. As a good reproduction contrast ratio ($=(A-B)/A$; A and B: reflected light intensities from the recorded and non-recorded portions, respectively) of 0.58 was obtained.

EXAMPLE 2

1 g of a monomer of the formula:

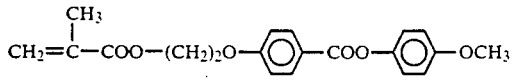

and 0.01 g of divinylbenzene were radically copolymerized with 0.0042 g of 2,2'-azobis-iso-butyronitrile (AIBN) to obtain a crosslinked side chain-type polymer liquid crystal (crosslinking degree: 2.8 mol %).

To the polymer liquid crystal was added 0.1 wt. % of the light-absorbing colorant used in Example 1. The mixture was dissolved in dichloroethane and applied by dip coating onto a 100 $\mu$m-thick polyester film to form an about 60 $\mu$m-thick polymer liquid crystal layer. Further, another 100 $\mu$m-thick polyester film was superposed on the polymer liquid crystal layer. The resultant laminate was passed through rollers at a temperature providing the polymer liquid crystal with isotropic phase to cause pressure bonding thereby to obtain a laminate having an about 50 μm-thick polymer liquid crystal layer between the two polyester sheets.

The laminate was stretched in the same manner as in Example 1 at a temperature providing the isotropic phase of the polymer liquid crystal, followed by gradual cooling at a rate of 1° C./minute to fix the nematic phase state. Then, the laminate was bonded to a polycarbonate substrate to prepare an optical card.

The optical card was subjected to data recording and reproduction in the same manner as in Example 1, whereby good data recording and reproduction were effected at a contrast ratio of 0.58.

EXAMPLE 3

A side chain-type ferroelectric polymer liquid crystal of the following structural formula and phase transition characteristic.

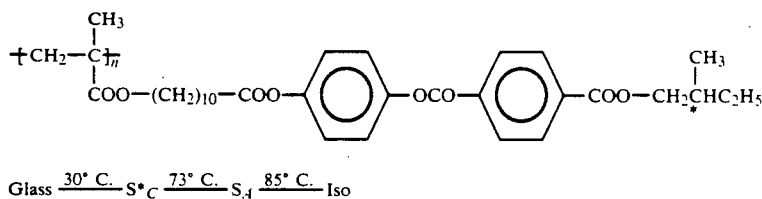

$$\text{Glass} \xrightarrow{30°\text{ C.}} S^*_C \xrightarrow{73°\text{ C.}} S_A \xrightarrow{85°\text{ C.}} \text{Iso}$$

was dissolved in a 1:1-mixture solvent of decalin and toluene under heating at 120° C., followed by rapid cooling to form a gel. The gel was subjected to rolling similarly as in Example 1 to form a laminate comprising a 10 μm-thick polymer liquid crystal layer between two polyester films.

The laminate was subjected to uniaxial stretching in the same manner as in Example 1 at a temperature of the isotropic phase of the polymer liquid crystal to provide a stretching ratio of 100%, whereby the polymer liquid crystal layer was uniformly aligned. Then, the laminate was gradually cooled to room temperature. The resultant polymer liquid crystal layer had a thickness of 5 μm.

Figure 3A:
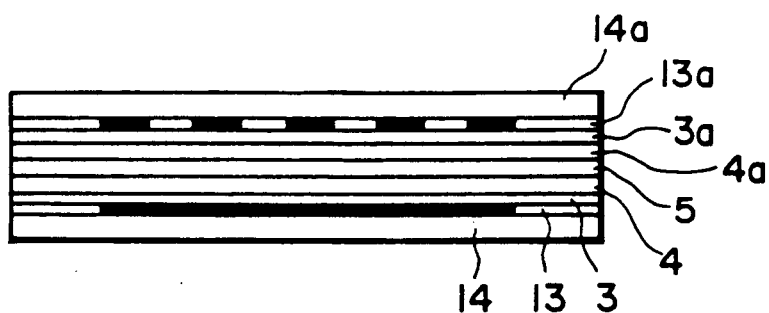
FIG. 3A is a sectional view of a display device according to Example 3 of the present invention.
Figure 3B:
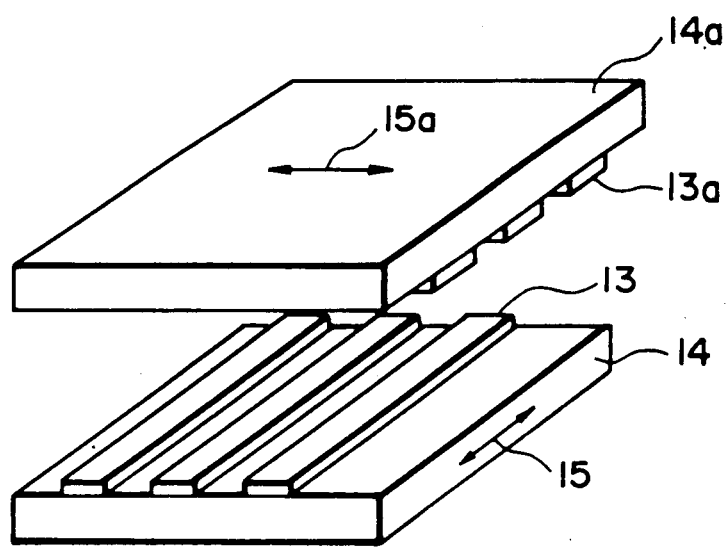
FIG. 3B is a schematic perspective view for illustrating a relationship between the direction of ITO film stripes formed on a pair of polarizing glass substrates and the polarizing directions, and a stacking structure of the polarizing glass substrates in Example 3 of the resent invention.

Referring to FIGS. 3A and 3B, the thus formed laminate 5 was disposed between and bonded to a pair of electrode plates each comprising stripe ITO films 13 (or 13a) on a polarizing glass substrate 14 (or 14a), by the medium of adhesive layers 3 and 3a. In FIG. 3B, the two-heated arrows 15 and 15a denote the polarizing directions of the polarizing glasses 14 and 14a.

The thus prepared display device was heated to 70° C. providing the SmC* phase of the polymer liquid crystal, and an electric field of 5 V/cm was applied between opposite electrodes, followed by cooling to below the glass transition temperature to fix the SmC* phase state of the polymer liquid crystal layer.

Figure 4:
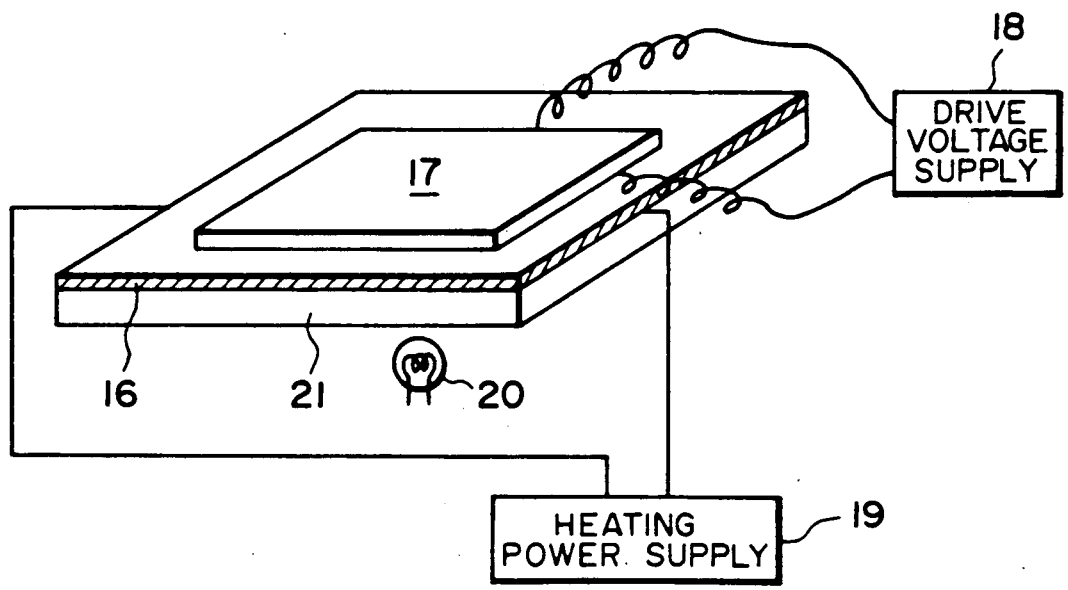
FIG. 4 is a schematic view of a display apparatus as used in Example 3 of the present invention.

Then, the device was subjected to a display operation in an apparatus system shown in FIG. 4. More specifically, the display device 17 obtained above was disposed on a transparent stage 21 having a layer of transparent resistive heating element 16 heated by a heating power supply 19. The display device was driven by applying an electric field of about 5 V/μm between ITO electrodes from a drive voltage supply 18 while being illuminated from a back light 20 disposed below the transparent stage. As a result, good display was accomplished at a display contrast ratio (=(A−B)/A; A and B: light transmittances at the display part and non-display part, respectively) of 0.58.

EXAMPLE 4

A polymer liquid crystal of the following structural formula and phase transition characteristic.

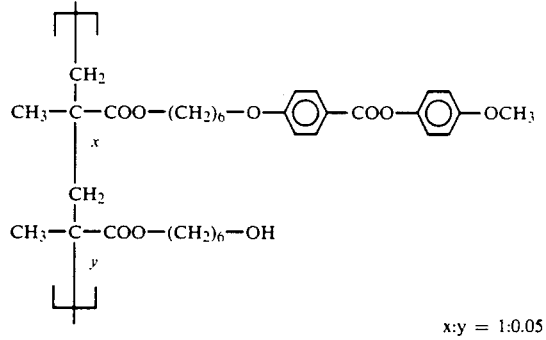

x:y = 1:0.05

$$\text{Glass} \xrightarrow{40°\text{ C.}} N \xrightarrow{106°\text{ C.}} \text{Iso}$$

was reacted with 1 mol % of hexamethylene diisocyanate (OCN—(CH₂)₆—NCO) to form a crosslinked polymer liquid crystal, which showed the following phase transition characteristic.

$$\text{Glass} \xrightarrow{45°\text{ C.}} N \xrightarrow{107°\text{ C.}} \text{Iso}$$

A mixture of the crosslinked polymer liquid crystal and 0.1 wt. % of the light-absorbing colorant used in Example 1 was dissolved in dichloroethane, and the solution was applied by screen printing to form an about 50 μm-thick polymer liquid crystal layer on a 100 μm-thick polyester film. An additional 100 μm-thick polyester film was superposed on the polymer liquid crystal layer, and the superposed structure was passed between rollers at a temperature of the isotropic phase of the polymer liquid crystal to effect pressure bonding to form a laminate comprising an about 20 μm-thick polymer liquid crystal layer between the two polyester films.

The laminate was uniaxially stretched and bonded to a polycarbonate substrate in the same manner as in Example 1 to prepare an optical card.

The optical card was subjected to data recording and reproduction in the same manner as in Example 1, whereby good data recording and reproduction were effected at a contrast ratio of 0.58.

EXAMPLE 5

A side chain-type ferroelectric polymer liquid crystal of the following structural formula and phase transition characteristic

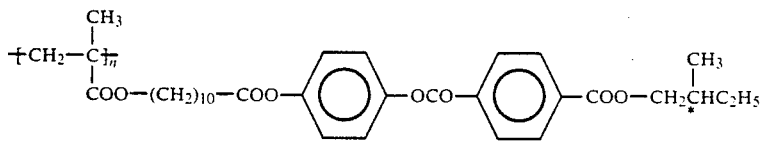

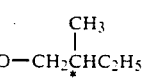

and 0.1 wt. % of the light-absorbing colorant used in Example 1 were dissolved in a 1:1-mixture solvent of decalin and toluene under heating at 120° C., followed by rapid cooling to form a gel. The gel was subjected to rolling similarly as in Example 1 to form a laminate comprising a 10 μm-thick polymer liquid crystal layer between two 30 μm-thick polyester films.

The laminate was subjected to uniaxial stretching in the same manner as in Example 3 at a temperature of the isotropic phase of the polymer liquid crystal to provide a stretching ratio of 100%, whereby the polymer liquid crystal layer was uniformly aligned. Then, the laminate was gradually cooled to room temperature. The resultant polymer liquid crystal layer had a thickness of 5 μm.

Figure 5:
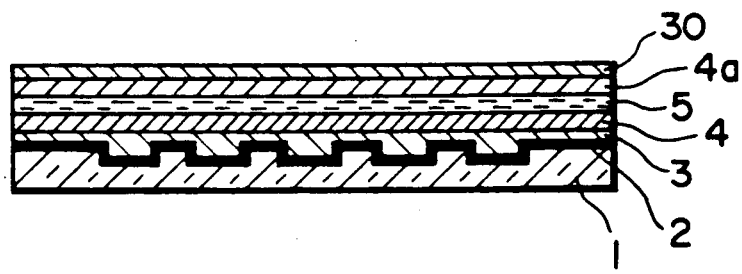
FIG. 5 is a sectional view of an optical card as produced in example 5 of the present invention.

Then, a pre-grooved substrate provided with an Al reflecting layer similar to one used in Example 1 was bonded to one side of the above laminate, and the other side was entirely coated with a vapor-deposited ITO film to prepare an optical card as shown in FIG. 5 which comprised a polycarbonate substrate 1, an Al layer 2, an adhesive layer 3, polyester layer 4 and 4a, a polymer liquid crystal layer 5 and an ITO layer 30.

The optical card was heated to 70° C. providing the SmC* phase of the polymer liquid crystal, and an electric field of about 5 V/ m was applied between the Al layer 2 and the ITO film 30, followed by cooling below the glass transition temperature to fix the polarized SmC* state of the polymer liquid crystal layer.

Figure 6:
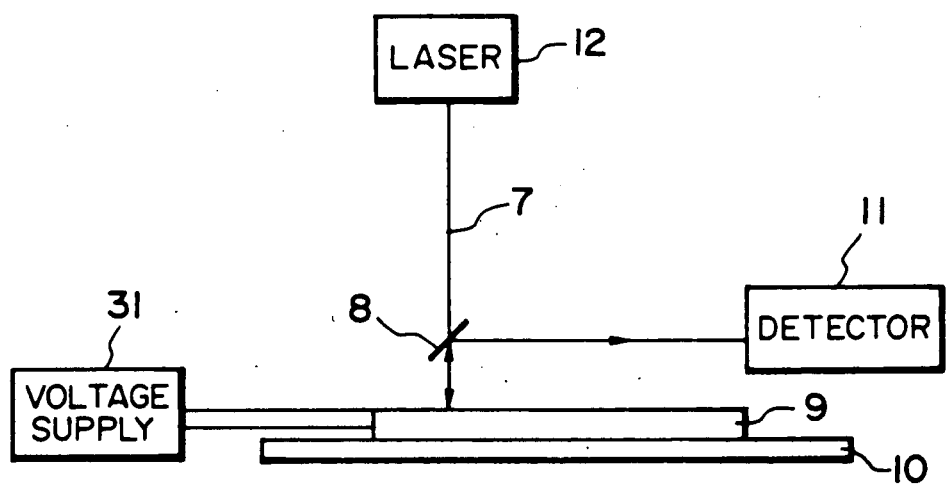
FIG. 6 is a schematic view of a recording and reproduction apparatus for an optical card.

The thus prepared optical card was subjected to data recording and reproduction by means of an apparatus system as shown in FIG. 6 which comprised a semiconductor laser 12 issuing laser light 7, a half mirror 8, an optical card 9 as prepared above, a movable stage 10, an optical detector 11 and a current detector circuit 31.

More specifically, data recording was effected by locally irradiating the ferroelectric polymer liquid crystal layer 5 with semiconductor laser light of $\lambda_{max}=830$ nm and a power of 5 mW through the ITO film 30 in the absence of an electric field to heat the ferroelectric polymer liquid crystal layer locally into its isotropic liquid phase, followed by cooling to form a non-polarized region.

Then, the power of the laser light 7 was lowered to 0.5 mW to illuminate the optical card to heat the polymer liquid crystal layer from 5° C. to 45° C. to generate a pyroelectric change, which was detected between the Al-ITO electrodes by the detector 3 at a good S/N ratio. Further, a good reproduction ratio of 0.58 was obtained between the polarized region and the non-polarized region. Further, a pyroelectric constant of 1 μC/m².K was obtained at 70° C. according to measurement by the constant rate heating and cooling method.

EXAMPLE 6

A main chain-type ferroelectric polymer liquid crystal of the following structural formula and phase transition characteristic

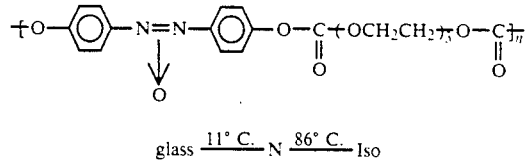

was dissolved in a 1:1-solvent mixture of decalin and toluene under heating at 100° C., followed by cooling to form a gel in the same manner as in Example 1. The gel was subjected to rolling similarly as in Example 1 to form a laminate comprising a 25 μm-thick polymer liquid crystal layer between two polyester films.

The laminate was subjected to uniaxial stretching in the same manner as in Example 2 at a stretching ratio of 110%, whereby the polymer liquid crystal layer was uniformly aligned to have a thickness of 10 μm.

Figure 7:
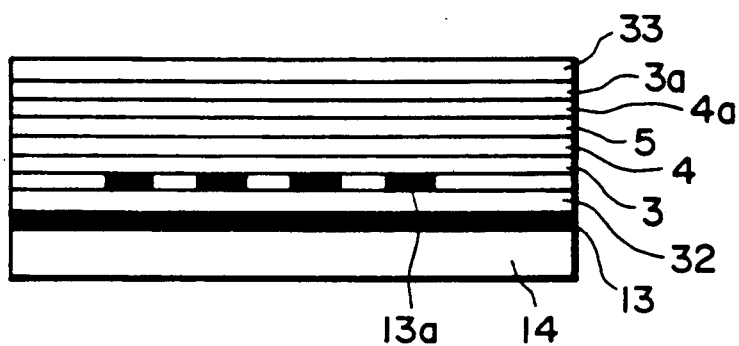
FIG. 7 is a sectional view of a display device as produced in Examples 6 and 8 of the present invention.

A display device of a laminate structure as shown in FIG. 7 was prepared by using the above prepared laminate comprising the polymer liquid crystal layer 5 between the polyester films 4 and 4a. Thus, separately, on a polarizing glass substrate 14 were successively disposed ITO stripes 13, a transparent resistive heat generating layer 32 and ITO stripes 13a. This structure was bonded to one side of the aboveprepared laminate by the medium of an adhesive layer 3, and a polarizing film 33 was bonded to the other side of the laminate by the medium of an adhesive layer 3a, so as to form cross nicols with the polarizing glass substrate 14 and to provide a maximum transmittance of the laminate in combination with the cross nicols.

Figure 8:
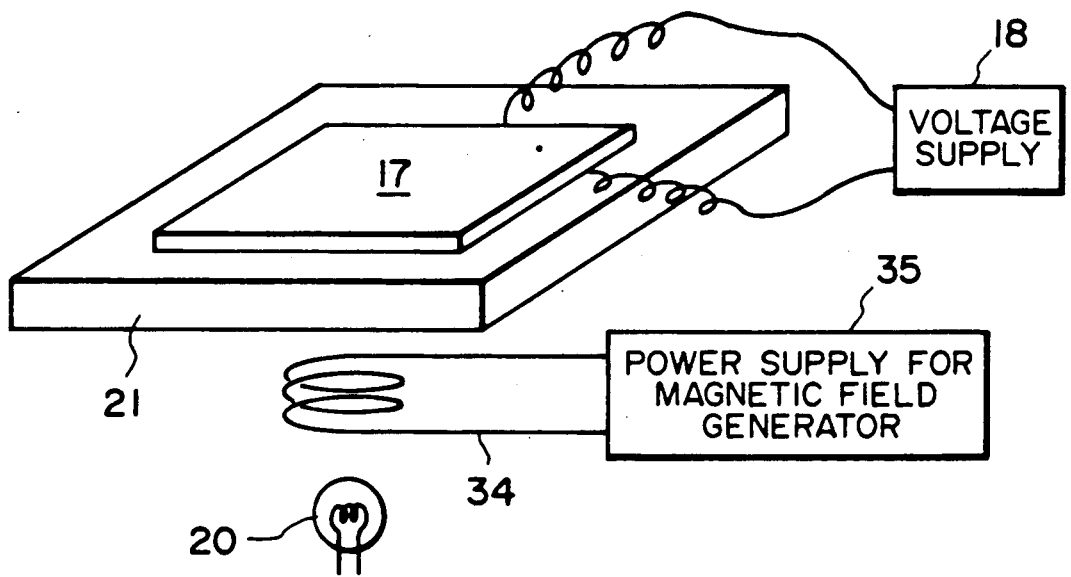
FIG. 8 is a schematic view of a display apparatus as used in Examples 6 and 8 of the present invention.

Referring then to FIG. 8, the thus prepared display device 17 was incorporated in a display apparatus which comprised a transparent stage 21 supporting the device 17, a back light 20 disposed below the stage 21, a magnetic field generator 34 connected to its drive circuit 35 and a voltage supply 18.

For the operation, the display device 17 was placed in a uniform magnetic field caused by the magnetic field generator. The magnetic field strength was so selected that the alignment change of homogeneous alignment-→homeotropic alignment did not occur at room temperature. In this state, a voltage was applied between the ITO stripes 13 and 13a to locally heat the polymer liquid crystal layer 5, whereby the heated portion of the polymer liquid crystal was changed to a homeotropic alignment state. A good display was effected at a display contrast of 0.57 by detecting the local difference of alignment state thus produced by means of the cross nicol polarizers.

EXAMPLE 7

A polymer liquid crystal of the following structural formula and phase transition characteristic

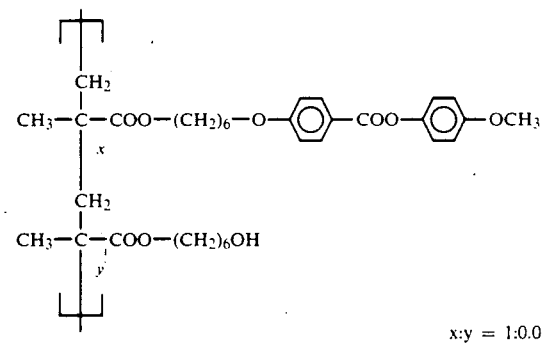

Glass $\xrightarrow{40°\text{ C.}}$ N $\xrightarrow{106°\text{ C.}}$ Iso, 0.2 wt. % of the light-absorbing colorant used in Example 1 and 1 mol % of hexamethylene diisocyanate were dissolved in dichloroethane, and the solution was applied by screen printing on a 100 μm-thick polyester film to form a polymer liquid crystal layer. An additional 100 μm-thick polyester film was superposed on the polymer liquid crystal layer, and the superposed structure was passed between rollers at 50° C. to effect pressure bonding to form a laminate comprising an about 30 μm-thick polymer liquid crystal layer between the two polyester films. The laminate was uniaxially stretched at a stretching ratio of 15% at 60° C., and then held at 60° C. to keep the polymer liquid crystal in its liquid crystal state.

Then, the laminate was held at 100° C. for 5 hours to have crosslinking proceed. After the cross-linking, the laminate was uniaxially stretched at a stretching ratio of 100% at 100° C. in the same manner as in Example 1. The laminate was bonded to a polycarbonate substrate to prepare an optical card.

The optical card was subjected to data recording and reproduction in the same manner as in Example 1, whereby good data reproduction was effected at a reproduction contrast ratio of 0.6.

EXAMPLE 8

Example 6 was repeated except that a main chain-type polymer liquid crystal of the following structural formula and phase transition characteristic was used.

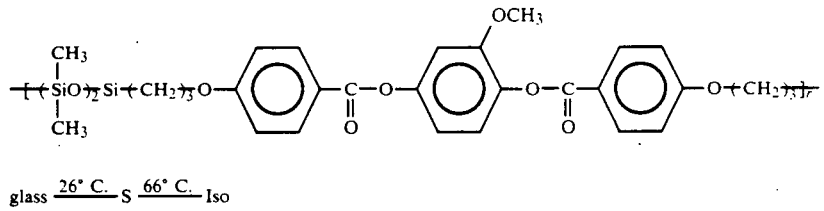

glass $\xrightarrow{26°\text{ C.}}$ S $\xrightarrow{66°\text{ C.}}$ Iso

As a result, a display contrast ratio of 0.53 was attained.

COMPARATIVE EXAMPLE 1

A polymer liquid crystal layer was formed similarly as in Example 1 except that the polymer liquid crystal and the light-absorbing colorant were dissolved in 10 ml of dichloroethane instead of the decalin-toluene mixture solvent, and the resultant solution was applied with a wire bar on a 100 μm-thick polyester film followed by removal of the solvent to form a polymer liquid crystal layer. An additional 100 μm-thick polyester sheet was superposed on the polymer liquid crystal layer. The superposed structure was pressure bonded by rolling to provide the polymer liquid crystal layer with a thickness of about 50 μm.

Thereafter, the laminate was subjected to stretching and formed into an optical card in the same manner as in Example 1. The recording and reproduction was effected by using the optical card in the same manner as in Example 1, whereby a reproduction contrast ratio of 0.45 was attained.

COMPARATIVE EXAMPLE 2

An optical card was prepared in the same manner as in Example 1 except that the divinylbenzene was not added. The optical card provided a reproduction contrast ratio of 0.42.

COMPARATIVE EXAMPLE 3

An optical card was prepared in the same manner as in Example 4 except that the reaction with hexamethylene diisocyanate was not effected. The optical card provided a reproduction contrast ratio of 0.43.

As described above, according to the present invention, a higher degree of alignment is attained by stretching a cross-linked polymer liquid crystal than the alignment obtained heretofore by stretching a non-crosslinked polymer liquid crystal. Further, a liquid crystal device prepared by sandwiching the thus aligned polymer liquid crystal element between a pair of substrates provides a good contrast ratio when used as a recording medium or display device. Further, when the present invention is applied to a ferroelectric polymer liquid crystal, a higher pyroelectric constant can be obtained whereby a signal based on a pyroelectric effect can be detected at a good S/N ratio.

What is claimed is:

1. An optical modulation device, comprising an aligned stretched layer, said layer being a stretched ferroelectric polymer liquid crystal having chiral smectic phase, said ferroelectric polymer liquid crystal comprising crosslinked polymer main chains.

2. A device according to claim 1, wherein said aligned stretched layer is disposed between a pair of polyester layers.

3. A device according to claim 1, wherein said stretching is effected at or above the glass transition temperature of the ferroelectric polymer liquid crystal.

4. A device according to claim 3, wherein said stretching is effected in a temperature range where the ferroelectric polymer liquid crystal is in a liquid crystal phase.

5. A device according to claim 1, wherein the aligned stretched layer has been obtained by pre-stretching a non-crosslinked ferroelectric polymer liquid crystal, crosslinking the prestretched ferroelectric polymer liquid crystal and then further stretching the crosslinked ferroelectric polymer liquid crystal.

6. A device according to claim 1, wherein the aligned stretched layer has been obtained by stretching a cross-linked ferroelectric polymer liquid crystal comprising polymer main chains crosslinked with a covalent bond.

7. A device according to claim 6, wherein said stretching is effected in a temperature range where the ferroelectric polymer liquid crystal is in a liquid crystal phase.

8. A device according to claim 6, wherein said crosslinked ferroelectric polymer liquid crystal has been obtained by reacting a crosslinking agent with a ferroelectric polymer liquid crystal.

9. A device according to claim 1, wherein the aligned stretched layer has been obtained by stretching a crosslinked ferroelectric polymer liquid crystal comprising polymer main chains crosslinked with a non-covalent bond.

10. A device according to claim 9, wherein said non-covalent bond is an ionic bond or hydrogen bond.

11. A device according to claim 10, wherein said ionic bond or hydrogen bond is obtained by reacting a ferroelectric polymer liquid crystal with a crosslinking agent.

12. A device according to claim 9, wherein said crosslinked ferroelectric polymer liquid crystal has been obtained by crosslinking with a block polymer.

13. A device according to claim 9, wherein said crosslinked ferroelectric polymer liquid crystal has been formed by addition of carbon black or silica.

14. A device according to claim 9, wherein said ferroelectric polymer liquid crystal features crosslinking by entanglement of polymer main chains.

15. A device according to claim 2, wherein said stretching is co-stretching applied to a laminate of said crosslinked ferroelectric polymer liquid crystal and a plastic substrate.

16. A device according to claim 15, wherein said laminate is formed by applying the ferroelectric polymer liquid crystal onto the plastic substrate by blade coating.

17. A device according to claim 1, wherein said stretching is uniaxial stretching.

18. A device according to claim 1, wherein said stretching comprises successive or simultaneous biaxial stretching.

19. A device according to claim 1, wherein said stretching is effected under application of an electric field or magnetic field.

20. A device according to claim 1, wherein said aligned stretched layer has a pyroelectric constant of 1 $\mu C/mm^2 \cdot K$ or higher.

21. An optical modulation device according to claim 1, wherein said aligned stretched layer is disposed between a pair of substrates each having thereon a plurality of stripe electrodes.

22. A recording apparatus, comprising:
an optical modulation device according to claim 11, and
a laser light source for supplying a laser light signal to the device.

23. A recording apparatus according to claim 22, wherein said laser light source comprises a semiconductor laser.

24. A display apparatus, comprising:
an optical modulation device according to claim 1,
an optical modulation device according to claim 1,
a means for heating the device, and
a light source for illuminating the device.

25. A display apparatus, comprising:
an optical modulation device according to claim 21,
a means for applying a voltage to the device,
a means for heating the device, and
a light source for illuminating the device.

26. A display apparatus, comprising:
an optical modulation device according to claim 21,
a means for generating a magnetic field,
a means for heating the device, and
a light source for illuminating the device.

* * * * *

UNITED STATES PATENT AND TRADEMARK OFFICE
CERTIFICATE OF CORRECTION

PATENT NO. : 5,039,208
DATED : August 13, 1991
INVENTOR(S) : TOSHIKAZU OHNISHI, ET AL.

It is certified that error appears in the above-identified patent and that said Letters Patent is hereby corrected as shown below:

SHEET 1 OF 4

FIG. 2, "DETECTER" should read --DETECTOR--.

COLUMN 1

Line 68, "and." should read --and--.

COLUMN 3

Line 12 "examples" should read --examples of--.

COLUMN 4

Line 26 "in" should read --is--.
Line 36 "mode," should read --mode--.

COLUMN 6

Formula (D), " 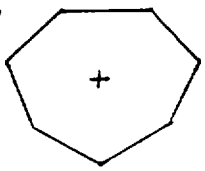 " should read -- 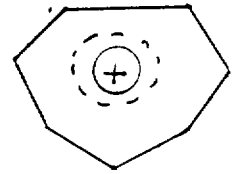 --.

COLUMN 7

Line 13, "stretching" should read --stretching of--.
Line 57, "from" should read --form--.

UNITED STATES PATENT AND TRADEMARK OFFICE
CERTIFICATE OF CORRECTION

PATENT NO. : 5,039,208
DATED : August 13, 1991
INVENTOR(S) : TOSHIKAZU OHNISHI, ET AL.

Page 2 of 4

It is certified that error appears in the above-identified patent and that said Letters Patent is hereby corrected as shown below:

COLUMN 11

Lines 50-54, " 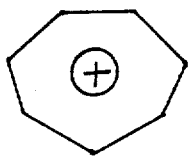 " should read -- 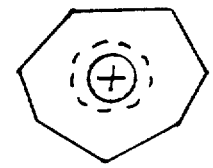 --.

COLUMN 14

Under Example 4,

" 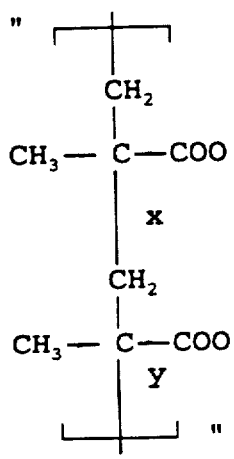 " should read -- 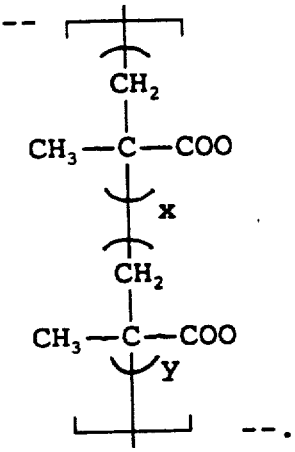 --.

UNITED STATES PATENT AND TRADEMARK OFFICE
CERTIFICATE OF CORRECTION

PATENT NO. : 5,039,208

DATED : August 13, 1991

INVENTOR(S) : TOSHIKAZU OHNISHI, ET AL.   Page 3 of 4

It is certified that error appears in the above-identified patent and that said Letters Patent is hereby corrected as shown below:

COLUMN 16

Line 54, "aboveprepared" should read --above-prepared--.

COLUMN 17

Under Example 7,

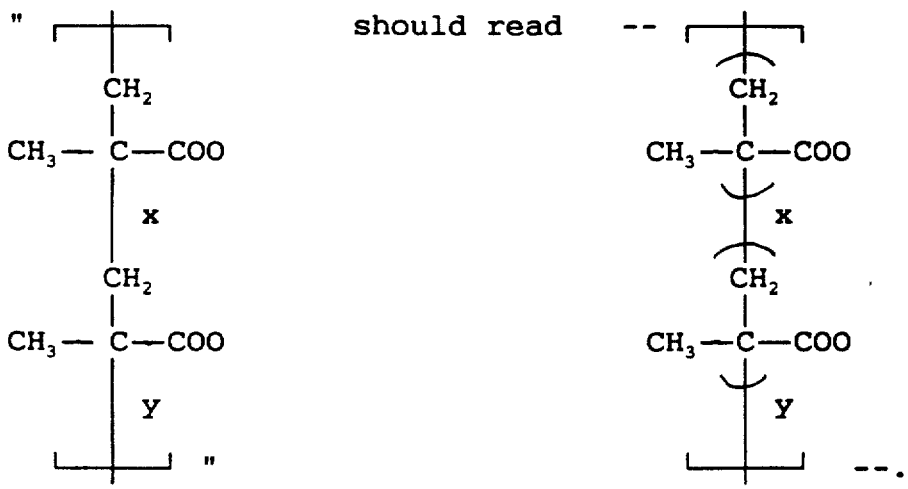

UNITED STATES PATENT AND TRADEMARK OFFICE
CERTIFICATE OF CORRECTION

PATENT NO. : 5,039,208
DATED : August 13, 1991
INVENTOR(S) : TOSHIKAZU OHNISHI, ET AL.

It is certified that error appears in the above-identified patent and that said Letters Patent is hereby corrected as shown below:

COLUMN 20

Line 36, "claim 11," should read --claim 1,--.
Line 45, delete line 45.

Signed and Sealed this

Thirtieth Day of March, 1993

Attest:

STEPHEN G. KUNIN

*Attesting Officer*    *Acting Commissioner of Patents and Trademarks*